US008240749B2

(12) United States Patent
Patschicke et al.

(10) Patent No.: US 8,240,749 B2
(45) Date of Patent: Aug. 14, 2012

(54) REAR FLOOR ARRANGEMENT AND FRAME STRUCTURE OF A SELF-SUPPORTING AUTOMOTIVE BODY

(75) Inventors: Hans-Joachim Patschicke, Otterberg (DE); Jens Hartmann, Floersheim (DE); Lothar Benner, Trebur (DE); Ralph Stenger, Mainhausen (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/367,943

(22) Filed: Feb. 7, 2012

(65) Prior Publication Data

US 2012/0133178 A1  May 31, 2012

Related U.S. Application Data (63) Continuation of application No. 12/831,101, filed on Jul. 6, 2010, now abandoned.

(30) Foreign Application Priority Data

| Jul. 6, 2009 | (DE) | 10 2009 031 781 |
| Jul. 28, 2009 | (DE) | 10 2009 034 908 |
| Sep. 2, 2009 | (DE) | 10 2009 039 808 |

(51) Int. Cl.
*B60J 7/00* (2006.01)
(52) U.S. Cl. .............. 296/193.07; 296/187.08
(58) Field of Classification Search ............ 296/193.07, 296/187.08
See application file for complete search history.

(56) References Cited

U.S. PATENT DOCUMENTS

| 3,022,105 A | 2/1962 | Tjaarda |
| 6,666,501 B1 | 12/2003 | Logan et al. |
| 2008/0315629 A1 | 12/2008 | Abe et al. |

FOREIGN PATENT DOCUMENTS

| DE | 866760 C | 2/1953 |
| DE | 934628 C | 11/1955 |
| DE | 2803603 A1 | 8/1989 |
| DE | 4119064 A1 | 1/1992 |
| DE | 4244217 A1 | 6/1994 |
| DE | 19746238 A1 | 5/1998 |
| DE | 19816031 A1 | 10/1999 |
| DE | 10330167 A1 | 2/2005 |
| DE | 102006006910 B3 | 5/2007 |

OTHER PUBLICATIONS

German Patent Office, German Search Report for German Application No. 102009039808.2, Jun. 23, 2010.
USPTO, Non-final Office Action for U.S. Appl. No. 12/831,101, dated Feb. 15, 2011.
Response to non-final Office Action for U.S. Appl. No. 12/831,101, dated May 12, 2011.

(Continued)

*Primary Examiner* — Joseph Pape
(74) *Attorney, Agent, or Firm* — Ingrassia Fisher & Lorenz, P.C.

(57) ABSTRACT

A rear floor arrangement as well as a frame structure of an automotive body are provided having at least one first supporting structure component, which may be disposed in the inner or dry region of the motor vehicle and which may be directly connected to a second supporting structure component and inside the inner or dry region of the vehicle, which is mounted ahead of the first supporting structure component in the direction of travel and which extends at least in certain areas over a floor middle of the body.

19 Claims, 4 Drawing Sheets

OTHER PUBLICATIONS

USPTO, Final Office Action for U.S. Appl. No. 12/831,101, dated Aug. 8, 2011.

Response to Final Office Action for U.S. Appl. No. 12/831,101, dated Oct. 3, 2011.

USPTO, Notice of Allowance for U.S. Appl. No. 12/831,101, dated Oct. 27, 2011.

REAR FLOOR ARRANGEMENT AND FRAME STRUCTURE OF A SELF-SUPPORTING AUTOMOTIVE BODY

CROSS-REFERENCE TO RELATED APPLICATION

This application is a continuation of U.S. application Ser. No. 12/831,101, filed Jul. 6, 2010, which claims priority to German Patent Application No. 102009039808.2, filed Sep. 2, 2009, claims priority to German Patent Application No. 102009031781.3, filed Jul. 6, 2009, and claims priority to German Patent Application No. 102009034908.1, filed Jul. 28, 2009, which are all incorporated herein by reference in their entirety.

DESCRIPTION

The present invention relates to a rear floor arrangement of an automotive body as well as a frame structure of an automotive under floor arrangement, which in each case comprises at least one supporting structure component lying in the inner or dry region of the motor vehicle.

BACKGROUND

Supporting structure components of an automotive body such as front frame, rear frame, longitudinal members as well as front and rear under floor on the one hand fulfill a static function by absorbing the vehicle weight or the weight of individual vehicle components such as that of the engine. On the other hand, at least some of these components must exhibit a defined deformation behavior in the event of the occurrence of extreme mechanical loads, possibly in the case of a vehicle collision.

The geometrical configuration of individual supporting structure components of an automotive body as well as their mechanical interconnection defines so-called load paths along which the impact energy which occurs in the event of a collision may be diverted in a manner which is as defined as possible. Load paths additionally fulfill the purpose of not only absorbing the collision-induced impact energy but also of keeping the acting forces away from the passenger compartment so that even in the event of serious vehicle collisions, these may fulfill their function as a survival space for the vehicle occupants.

In addition to the mechanical loading requirements to be satisfied, there is a continuous desire to reduce the weight of the automotive body and the motor vehicle as a whole to minimize the fuel consumption.

Known from DE 103 30 167 A1, for example, is a rear floor unit which comprises a rear floor module containing a transverse support upper flange and a frame module containing a transverse support lower flange. Disposed between the transverse support upper flange and the transverse support lower flange is a bracket system which is joined to the upper and lower flange by welding.

Furthermore, the use of light construction materials may be taken into consideration as a weight-saving measure in car body manufacture. Press-hardened components of steel or sheet steel as well as the use of metal sheets having a high fraction of light metals such as magnesium or aluminum or consisting entirely of such comparatively light low-density materials may be considered as suitable light construction materials.

However, as a result of their only moderate corrosion resistance, light construction materials may only be used to a limited extent for exterior components of an automotive body such as front frame, rear frame, longitudinal or transverse members.

Supporting structure components in aluminum or magnesium light-weight construction as well as press-hardened steel sheets for use in the outside region of motor vehicles must therefore always be provided with a protection layer against corrosion. However, the application of a protective layer, possibly by zinc plating, may only be applied very inadequately, for example, for press-hardened steel sheets as a result of thermal stresses in the forming process. In addition, an application of a metal protective layer is always associated with an increase in weight and also an increase in costs.

Thus, for example, DE 10 2006 006 910 B3 describes the use of zinc lamellar-coated steel structural components in chassis frame structures or chassis structures of a motor vehicle formed from a steel/light metal composite. Such a coating comes into consideration in particular for the load-bearing structural components, in particular for those of high or ultrahigh strength steels.

It is at least one object of the present invention to provide an improved supporting structure arrangement, in particular for the rear region of a motor vehicle, which does justice to the mechanical load requirements, which has a comparatively low weight, which may be manufactured in a cost-saving manner, and optionally creates additional installation space. In addition, other objects, desirable features, and characteristics will become apparent from the subsequent detailed description of the invention and the appended claims, taken in conjunction with the accompanying drawings and this background.

SUMMARY

The at least one object is achieved in accordance with the invention with a rear floor arrangement as well as by means of a frame structure as well as with a motor vehicle The rear floor arrangement in accordance with an embodiment of the invention is designed for a self-supporting automotive body and comprises at least one first supporting structure component, which may be disposed in the inner or dry region of the motor vehicle and which may be directly connected to a second supporting structure component, which at least with regard to its adjoining connecting region also comes to lie in the inner or dry region of the vehicle. The supporting structure component is formed outside and independently of the rear floor arrangement as part of an under floor arrangement of a self-supporting vehicle body.

The second supporting structure component is mounted ahead in relation to the first supporting structure component in the direction of travel of the vehicle. The supporting structure component preferably extends at least in certain areas over a floor middle of the vehicle body. The second supporting structure component may in this case be configured, for example, as an extension of a front frame or as a longitudinal member of a self-supporting vehicle body, which may be connected, for example, in the region of a heel plate of the rear floor arrangement to a supporting structure component of the rear floor arrangement or a corresponding rear floor module in the inner or dry region of the vehicle.

In principle, any connecting and joining method usual in vehicle body construction, in particular welding methods, comes into consideration for connecting first and second supporting structure components.

Since the individual supporting structure components of adjoining under floor sections of a self-supporting vehicle body are connected to one another directly and in the inner or dry region of the motor vehicle, a structure-reinforcing and module-overlapping, optionally load-path transmitting supporting structure of an under floor arrangement extending from the vehicle front to the vehicle rear is obtained.

It is found to be advantageous in this case that the connecting region of first and second supporting structure components comes to lie in the inner or dry region of the motor vehicle so that in principle it is not necessary to provide the components in this region with any corrosion protection. This is because by shifting connecting or node points into the inner or dry region of the motor vehicle, these are largely protected from moisture and other weather influences.

According to a first advantageous embodiment of the invention, it is provided that the first supporting structure component is configured as a profile part extending substantially in the vehicle longitudinal direction and delimiting the rear floor in the vehicle transverse direction. The first supporting structure component may in this case be configured in particular as part of a rear or back frame of the vehicle body.

According to another advantageous embodiment of the invention, the profile part forming the corresponding first supporting structure component may be configured as a downwardly open cross-sectional profile at least in certain areas, in particular a downwardly open C profile or top hat section. In the installed position or in the final mounting position on the motor vehicle, it is thereby provided that the downwardly open region of the profile cross section is closed at least in certain areas by an under floor, possibly a floor side or a floor rear, and/or even directly by the second supporting structure component. A corresponding section of the under floor or the second supporting structure component may in this case function as a closing panel.

Due to the arrangement in accordance with the invention of a connection of a rear floor arrangement on a forward-lying under floor region of the vehicle body which has been shifted into the inner or dry region of the motor vehicle, it is advantageously achieved that the floor panel of the vehicle separating the wet and dry region is lowered compared with the hitherto usual exterior arrangement of supporting structure components so that additional installation space may now be obtained between interior supporting structure components.

Thus, the floor panel hitherto disposed above supporting structure components, possibly above a longitudinal member or above a front frame extension may now be located in a lower position, i.e. below corresponding supporting structure components of the motor vehicle. In addition to an increase in interior installation space, this arrangement also proves to be advantageous in the aerodynamic respect since the vehicle or its under floor arrangement may be downwardly directed, fitted with a substantially flat floor panel, which has a lower air resistance during operation of the vehicle compared to a supporting structure disposed underneath the floor panel, which is usual in the prior art. In this respect an under floor cladding to be attached separately may also be dispensed with.

According to an embodiment of the invention it is provided in particular that specifically the connecting region of a rear floor arrangement located at the front in the direction of travel is completely clad by a floor panel functioning as a closing panel for supporting structure components in an aerodynamically advantageous manner.

According to a further embodiment of the invention it is provided that the rear floor arrangement has at least two first supporting structure components of preferably symmetric geometry which are spaced apart from one another in the vehicle transverse direction, each extending in the vehicle longitudinal direction. At the same time, the two first supporting structure components are advantageously connected to one another by means of at least one transverse member. The supporting structure components and also the transverse members may each be configured as a downwardly open C profile or top hat section, which may be closed by providing a floor panel located there under and functioning as a closing panel.

According to a further embodiment of the invention, it may further be provided that the first supporting structure component forms a boundary of a wheel housing toward the vehicle outer side. If a separate wheel housing cladding is to be provided, it is also feasible to configure the first supporting structure component in the form of an L- or Z-shaped profile part, which is closed by means of or by combining a floor panel with the wheel housing cladding.

It is provided in particular according to the invention that the supporting structure components to be arranged in the inner or dry region of the motor vehicle are executed in lightweight construction. For this it is preferable to use lightweight construction materials, possibly press-hardened high-strength or ultrahigh strength steel sheet, aluminum or magnesium, wherein the latter may preferably be used for the manufacture of a supporting structure component configured as a cast component.

In this connection it further proves to be advantageous if the supporting structure components are configured to be free from corrosion protection. A corrosion preventive layer hitherto usual in the prior art is no longer absolutely essential as a result of the supporting structure components disposed in the inner or dry region of the motor vehicle. Due to the arrangement in accordance with the invention, a hitherto usual corrosion preventive layer can therefore be dispensed with. By this means the manufacturing costs and the manufacturing complexity for such supporting structure components may be advantageously reduced.

According to a further independent aspect, the invention further relates to a frame structure of an under floor arrangement of a self-supporting body of a motor vehicle. This comprises at least one first supporting structure component disposed in the region of a rear floor and at least one second supporting structure component mounted ahead of the first supporting structure component in the direction of travel of the motor vehicle. The second supporting structure component is in this case preferably provided in the region of a floor middle of the under floor arrangement. The first and second supporting structure components preferably formed by profile parts miming substantially in the vehicle longitudinal direction are connected to one another at least in certain areas lying in the inner or dry area of the vehicle.

It further proves to be advantageous if the first and the second supporting structure components come to lie entirely in the inner or dry region of the vehicle. By means of this measure the individual components can be effectively protected against moisture and against other corrosive influences, in particular against contamination. Thus, in particular the application of a corrosion preventive layer can be omitted. In addition to the saving of individual fabrication and treatment steps, this may further contribute to a reduction in the respective component weight and the overall vehicle weight.

According to an advantageous further embodiment it is provided in this case that the first supporting structure component is configured as part of a rear frame of an automotive body and the second supporting structure component is configured as a longitudinal member or as an extension of a front frame of the automotive body.

By analogy with the configuration of the rear floor arrangement, it may be provided both for the first and for the second supporting structure component that these have a downwardly open cross-sectional profile at least in certain areas, which in the installed position on the motor vehicle are closed at least in certain areas by a correspondingly provided floor section, in particular by a respective floor panel.

According to a further advantageous embodiment of the invention, it is further provided that the first supporting structure component is supported on the second supporting structure component in the transition region to the second supporting structure component forming a vertical offset. In particular, it may be provided that the first supporting structure component has a downwardly open cross-sectional profile, which is closed by connection and abutment against the upper side of a longitudinal member functioning as second supporting structure component or a corresponding extension of the front frame. The downwardly open supporting structure component advantageously has a connecting flange abutting against the upper side of the first supporting structure component.

Due to the mutually abutting, overlapping or over projecting arrangement of first and second supporting structure components, it may further be achieved that a downwardly open profile cross section of the first supporting structure component is closed by the second supporting structure component which functions as a closing panel, and which is preferably also configured as a profile component.

For the frame structure it is also provided according to the invention in particular that the supporting structure components to be disposed in the inner or dry region of the motor vehicle are designed in lightweight construction. In accordance with the configuration provided for the rear floor arrangement, for the under floor frame structure it is also preferable to use lightweight construction materials, possibly press-hardened high- or ultrahigh strength steel sheet, aluminum, or magnesium, wherein the latter may preferably be used to manufacture a supporting structure component configured as a cast component. These supporting structure components should preferably be configured as free from corrosion protection.

In addition to the aforementioned rear floor arrangement and the frame structure, the invention further relates to a motor vehicle fitted with a rear floor arrangement in accordance with the invention and/or a frame structure in accordance with the invention.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
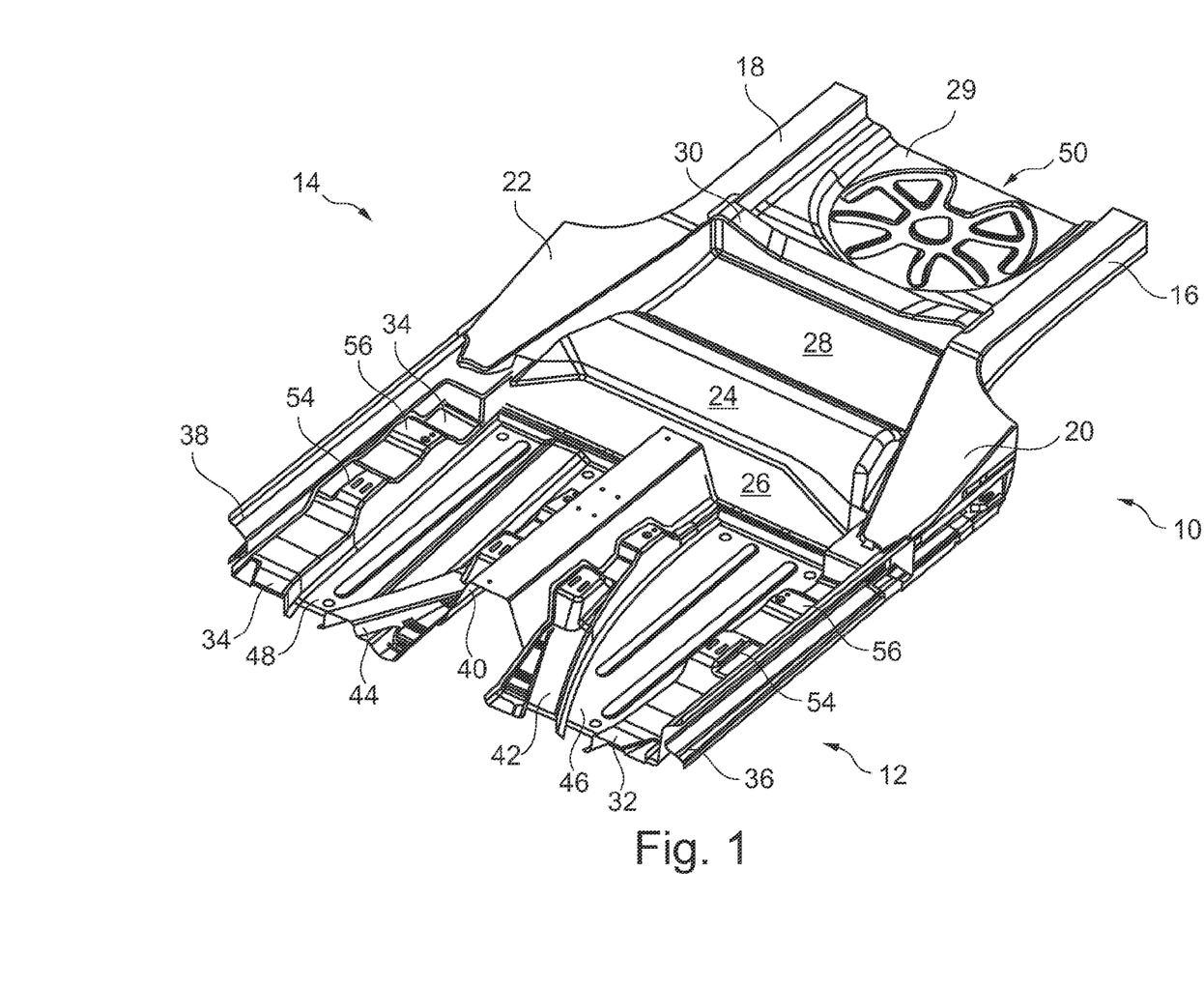
FIG. 1 shows a perspective view of an under floor arrangement of a self-supporting automotive body.

FIG. 1 shows in perspective view a frame structure 14 of an under floor arrangement of a self-supporting body of a motor vehicle. This is divided into a rear floor arrangement 10 and into an under floor middle 12. The overall frame structure 14 comprises individual supporting structure components 16, 18, 20, 22, 30, 32, 34, 42, 44, which are provided in the region of the floor middle 12 and also in the region of the rear floor arrangement 10. Thus, the rear floor arrangement 10 shown in isolated perspective view in FIG. 2 comprises laterally disposed first supporting structure components 16, 18, 20, 22, 30. These supporting structure components are preferably formed as part of a rear frame of the vehicle.

Figure 2:
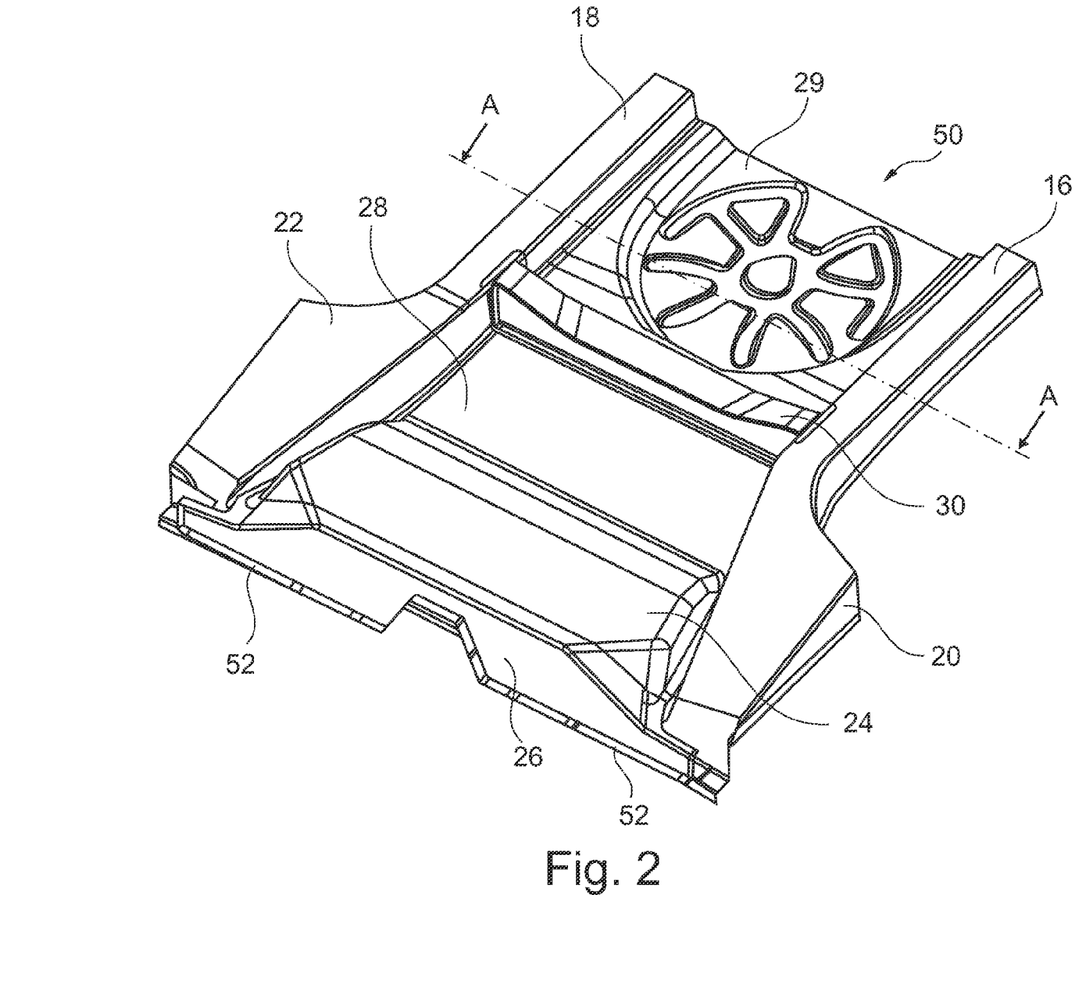
FIG. 2 shows a perspective and isolated view of a rear floor arrangement.

The profile parts designated in the context of the invention as first supporting structure components 16, 20 and 18, 22 extend substantially in the vehicle longitudinal direction. Toward the vehicle outer side these adjoin a wheel housing for the respective rear wheel of the motor vehicle or are even an integral component of a wheel housing cladding. The backward-lying sections 16, 18 may be configured in one piece with forward-lying sections 20, 22 in the direction of travel to form a continuous profiled supporting structure component. However, the frame parts extending in the vehicle longitudinal direction may also be formed in two parts, divided in the longitudinal direction of the vehicle.

The supporting structure components 16, 18, 20, 22, 30 may each be configured in the form of a downwardly open profile part at least in certain areas, which may each be closed with the floor 28, 29 located there under, functioning as a closing panel.

Figure 6:
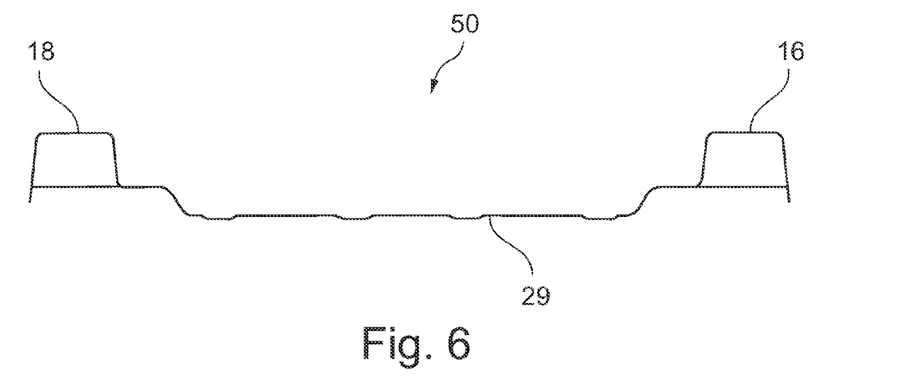
FIG. 6 shows a cross-section through the rear floor arrangement along the line of intersection A-A in accordance with FIG. 2.

The corresponding floor sections 28, 29 may be configured in this case as a one-piece floor panel but also as panel sections which abut against one another or overlap in certain areas. The floor rear 29 additionally has a downward-directed spare wheel recess 50 shown in FIG. 2 and FIG. 6. The floor panel or panels 28, 29 in this case form a division between dry and wet areas of the motor vehicle.

Due to the supporting structure components 16, 18, 20, 22, 30 located above the floor panel 28, 29, it may advantageously be achieved that these may be configured to be free from corrosion protection so that in particular when using high-strength or ultrahigh-strength steel sheets or when using materials particularly liable to corrosion such as aluminum or magnesium cast components, the application of a corrosion preventive layer may be advantageously dispensed with while reducing the manufacturing costs and expenditure.

In addition, due to the interior arrangement of the supporting structure components 16, 18, 20, 22, the level of the floor panel 28, 29 is somewhat lowered so that, for example, for creating a sufficiently deep spare wheel recess 50 the floor panel 29 provided for this purpose need only be deformed or embossed by a comparatively small amount compared with a hitherto usual arrangement above supporting structure components.

For the forward-directed connecting region of the rear floor arrangement 10 in the direction of travel, there is provided a direct connection of the respective supporting structure components 20, 22 with supporting structure components 32, 34 of the under floor section 12 mounted ahead in the direction of travel. As is illustrated by reference to FIG. 3 to FIG. 5, the rear frame section 20, 33 lies directly on the upper side of a longitudinal member 32, 34 mounted ahead in the direction of travel and firmly connected to the member there, possibly using conventional joining methods such as, for example, by means of welding.

Figure 3:
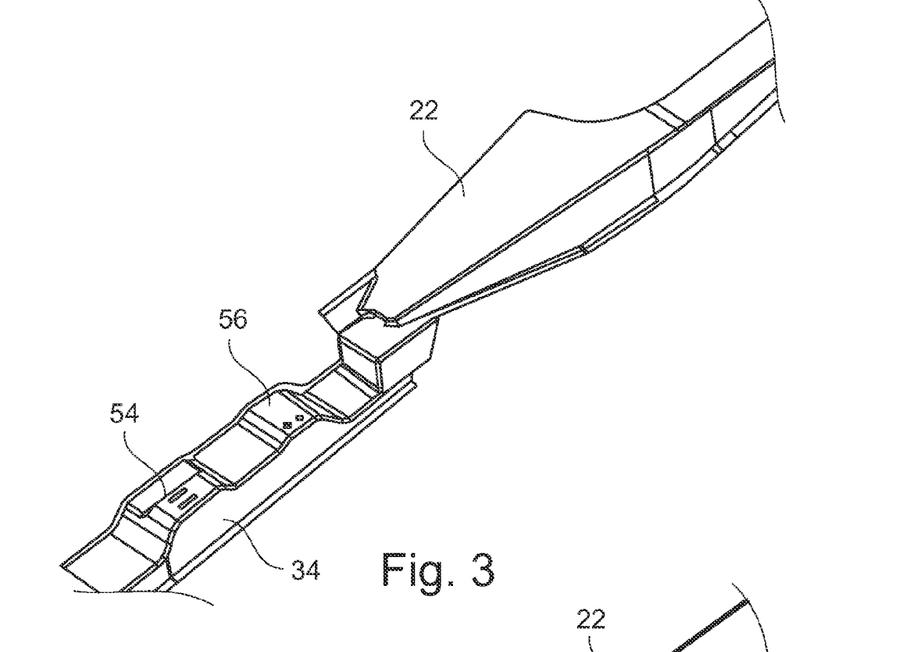
FIG. 3 shows an isolated perspective view of first and second supporting structure components in the mutual connection region.
Figure 4:
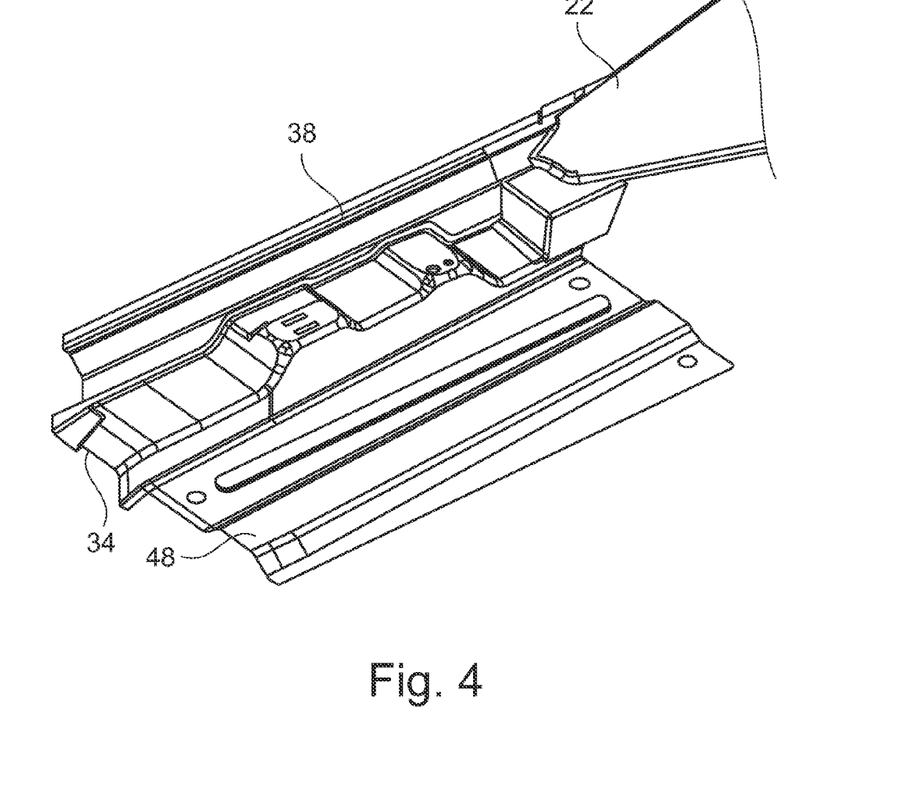
FIG. 4 shows a perspective view of the connecting section in accordance with FIG. 3 with adjoining side skirt and floor panel.
Figure 5:
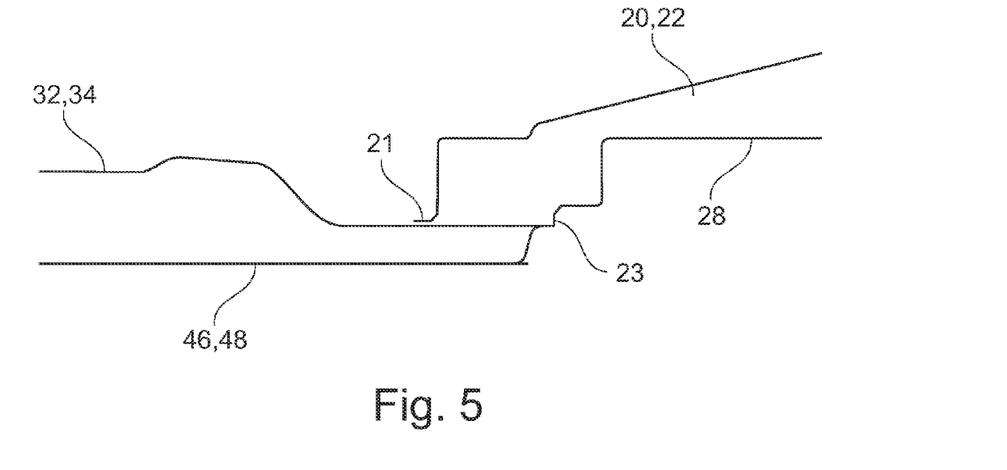
FIG. 5 shows a cross-sectional view through the connecting region in accordance with FIG. 3 in the longitudinal direction.

In the transition region of first and second supporting structure components 20, 22, 32, 34, for example, there are provided flange-like turned-out connecting sections 21, 23 which provide a sufficiently large contact surface for the supporting structure components 20, 22, 32, 34 to be joined together to form a firm connection of the two supporting structure components.

As shown in the cross-section in FIG. 5, it may be provided, for example, that the upper side of a rear frame section 20, 22 viewed in the direction of travel runs downward at an inclination and comes to abut against the upper side of the respective longitudinal member 32, 34 forming a vertical shoulder. At the same time, it may further be provided that both the longitudinal member 32, 34 and also the rear frame section 20, 22 are each configured as downwardly open profile components, which are closed by a respectively appurtenant floor panel 28, 46, 48, which at the same time functions as a type of closing panel.

In this context, it is provided in particular that in the transition region from the rear floor arrangement 10 to the floor middle 12 mounted in front, the respective floor panels 28, 46, 48 are firmly connected to one another forming a vertical offset directly adjacent to one another, possibly forming a butt or overlap region so that the supporting structure components 20, 22, 32, 34 located there above are sufficiently protected from weathering influences.

This interior arrangement of supporting structure components 20, 22, 30, 32, 34 allows the use of lightweight construction materials free from corrosion protection, such as press-hardened high or ultrahigh-strength steel sheets, aluminum or magnesium panels, or corresponding cast components.

The rear floor arrangement 10 shown separately in FIG. 2 further has, in its forward-lying section in the direction of travel, a seat ramp 24 which being forward-directed goes over into a substantially vertically aligned heel plate 26, wherein the heel plate is preferably configured as a seat transverse member. A mounting flange 52 is formed at the foot of the heel plate 26, which with the floor panels 46, 48 and with a central tunnel 40 lying between the panels 46, 48 in the vehicle transverse direction, comes to rest in the end mounting position shown in FIG. 1 in a fastening manner.

The diagrams in accordance with FIG. 1 and FIG. 4 also show side skirts 36, 38 which may extend over the connecting region of floor middle 12 and rear floor arrangement 10 to stabilize the connection and to form a corresponding node point. The floor middle 12 or the extension of the front frame, which extends underneath the passenger compartment, has respectively two longitudinal members 34, 44 and 32, 42 on both the left and the right of the central tunnel 40. The external longitudinal members 32, 34 protrude towards the respective side skirts 36, 38 while the internal longitudinal members 42, 44 each abut laterally on the central tunnel 40.

All the longitudinal members 32, 34, 42, 44 may be formed in this case as a downwardly open C profile or top hat section, at least in certain areas, which is closed by the appurtenant floor panel 46, 48. In the region of an abutment against the central tunnel 40 or against the side skirts 36, 38, these profile parts 32, 34, 42, 44 designated as second supporting structure components in the context of the application may also assume a type of Z- or L-profile-like shape, wherein a combination of appurtenant floor panel 46, 48 and side skirt 36, 38 or central tunnel 40 forms a closing panel for the respective profile part section 32, 34, 42, 44.

The longitudinal members 32, 34, 42, 44 disposed in the region of the floor middle 12 and running substantially in the vehicle longitudinal direction each have seat mounting sections 54, 56 on their upper side. These fastening means 54, 56 configured in the manner of fastening plateaus may then either be fastened separately and preconfigured onto the longitudinal members 32, 34, 42, 44 or incorporated into these members in one piece by introducing local deformations, possibly in the course of a deep-drawing or embossing process.

Since all the supporting structure components 16, 18, 20, 22, 30, 32, 34, 42, 44 are preferably all arranged above floor panels 28, 29, 46, 48, said structural components may be formed in lightweight design and configured to be free from corrosion protection or coating-free, which readily allows the use of materials which are otherwise comparatively easily susceptible to corrosion such as magnesium and aluminum pressure cast components and/or high or ultrahigh strength steel sheets.

Also due to the arrangement of all the supporting structure components 16, 18, 20, 22, 30, 32, 34, 42, 44 on the vehicle inner side, the respective vehicle floor section 46, 48, 28, 29 may be laid downward by the mounting height of the respective supporting structure components so that the footwell or the rear floor of the vehicle may be lowered and the interior space may thus be enlarged. In particular, due to the arrangement of the floor panel at the bottom, an under floor cladding, which is otherwise usual in the prior art, may be dispensed with in a cost-saving and weight-saving manner.

Also by lowering the floor panel or panels the entire center of gravity of the vehicle may be shifted downward and this may be accompanied by reducing the roof height of the vehicle with improved vehicle aerodynamics.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A rear floor arrangement of an automotive body, comprising:
    a second supporting structure component extending in a vehicle longitudinal direction, the second supporting structure component being separate from, extending at least above, and delimiting a floor middle of the automotive body;
    a first supporting structure component extending in the vehicle longitudinal direction, the first supporting member being separate from, disposed in, and delimiting, a rear floor of a motor vehicle and further configured to directly connect to the second supporting structure component, wherein the second supporting structure component is mounted ahead of the first supporting structure component and extending in the same longitudinal direction.

2. The rear floor arrangement of claim 1, wherein the first supporting structure and the second supporting structure are located in an inner region.

3. The rear floor arrangement of claim 1, wherein the first supporting structure and the second supporting structure are located in a dry region.

4. The rear floor arrangement according to claim 1, wherein the first supporting structure component is configured as a profile part extending substantially in a vehicle longitudinal direction and delimiting the rear floor in a vehicle transverse direction.

5. The rear floor arrangement according to claim 1, wherein the first supporting structure component has a downwardly open cross-sectional profile.

6. The rear floor arrangement according to claim 1, wherein the first supporting structure component has a downwardly open cross-sectional profile closed by the rear floor.

7. The rear floor arrangement according to claim 1, wherein the first supporting structure component has a downwardly open cross-sectional closed by the second supporting structure component.

8. The rear floor arrangement according to claim 1, comprising a second first supporting structure component, wherein at least the first supporting structure component and the second first supporting structure component are spaced apart from one another in the vehicle transverse direction are connected to one another with at least one transverse member.

9. The rear floor arrangement according to claim 1, wherein the first supporting structure component is configured as a high-strength steel sheet.

10. The rear floor arrangement according to claim 1, wherein the first supporting structure component is configured as a cast component fabricated from a light metal.

11. The rear floor arrangement according to claim 1, wherein the first supporting structure component is configured to be free from corrosion protection.

12. A frame structure of an under floor arrangement of a self-supporting body of a motor vehicle, comprising:
a rear floor;
a floor middle;
at least one first supporting structure component disposed in a region of the rear floor, separate from the rear floor and located above the rear floor; and
at least one second supporting structure component disposed in the region of the floor middle, separate from the floor middle and located above the floor middle,
wherein, first and second supporting structure components are connected to one another.

13. The frame structure according to claim 12, wherein the at least one first supporting structure component is configured as part of a rear frame and the at least one second supporting structure component is configured as a longitudinal member.

14. The frame structure according to claim 12, wherein the at least one first supporting structure component and the at least one second supporting structure component are disposed entirely in the region of the motor vehicle.

15. The frame structure according to claim 12, wherein one or more of the at least one first supporting structure component or the at least one second supporting structure component have a downwardly open cross-sectional profile that in an installed position on the motor vehicle is closed by a corresponding floor section.

16. The frame structure according to claim 12, wherein the at least one first supporting structure component is supported on the at least one second supporting structure component in a transition region to the at least one second supporting structure component forming a vertical offset.

17. The frame structure according to claim 12, wherein the at least one first supporting structure component or the at least one second supporting structure component are configured as a high-strength steel sheet.

18. The frame structure according to claims 12, wherein the at least one first supporting structure component or the at least one second supporting structure component are configured as a cast component fabricated from a light metal.

19. The frame structure according to claim 12, wherein the at least one first supporting structure component or the at least one second supporting structure component are configured to be free from corrosion protection.

* * * * *